Figure 1:
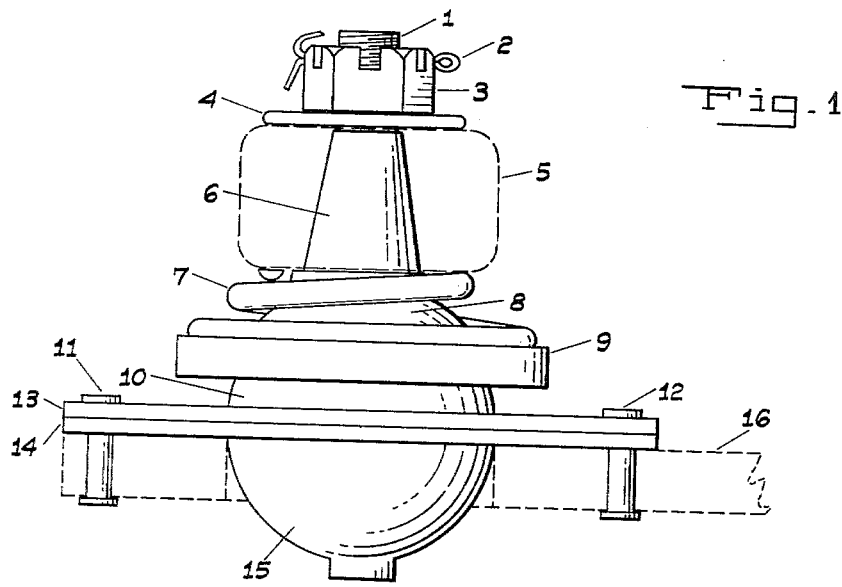

Aug. 24, 1965

W. A. ROWLETT 3,202,444

BALL JOINT SUSPENSION KIT

Filed Sept. 5, 1961

Willard A. Rowlett
INVENTOR.

BY Floyd Trimble
Attorney

United States Patent Office 3,202,444
Patented Aug. 24, 1965

3,202,444
BALL JOINT SUSPENSION KIT
Willard A. Rowlett, 409 Hatley Drive,
Oklahoma City, Okla.
Filed Sept. 5, 1961, Ser. No. 135,926
1 Claim. (Cl. 287—87)

This invention relates to suspension devices for motor vehicles and more particularly it relates to a repair kit for use with a ball joint suspension assembly of the type commonly used in the front suspension of motor vehicles.

Ball joint suspension assemblies as heretofore available have in general a common fault; namely, a certain degree of looseness of fit between the housing or socket and the ball forming the joint. This looseness is occasioned during the manufacturing of the component parts of the joints in that when the housing which is formed of two units, one being a stamping and the other a machine and heat-treated unit, is assembled the tolerance of desired fit cannot be kept to the desired minimum. Therefore, in all such assemblies some such looseness is present which may amount to $\frac{1}{16}$ of an inch or more between mating parts. Even new automobiles using such wheel suspension connections have been found to have undesired looseness of fit. At these critical points an accurate, snug fitting connection is imperative in front wheel suspension to eliminate excessive tire wear by continual caster and camber changes; to prevent road wander of the vehicle; to eliminate front wheel shimmy at speeds from 50 to 60 miles per hour on curves; and, to eliminate canting of the front wheels.

In an attempt to alleviate the foregoing objections due to a loose fit it has been proposed to provide a helical tapered spring adapted to surround a shank of a ball joint stud between its connection with a wheel steering knuckle and the ball joint housing connected to the distal end of a load supporting arm. A retaining member supports one end of the spring on the outer surface of the ball joint housing while a washer-like seat in contact with the wheel steering knuckle nests the opposing end of the spring. Various other means have also been proposed to overcome the foregoing deficiency, but none to the best of my knowledge have been entirely satisfactory. As one disadvantage the member in contact with the outer surface of the ball joint housing must be treated in some manner to prevent "galding."

It is, therefore, a principal object of the present invention to provide a ball joint suspension repair kit that obviates the disadvantages of the prior art kits of this character.

It is another object of my invention to provide a ball joint suspension repair kit that will when installed maintain a uniform tenson on the joint assembly at all times.

It is another object of this invention to provide a ball joint repair kit that will when installed maintain a predetermined aligned position under all driving conditions and yet permit freedom of movement as required.

It is another object of my invention to provide a ball joint repair kit that will when installed operate in the manner of a shock absorber, that is self adjusting and will require a minimum of attention following its installation.

It is another object of the present invention to provide a ball joint repair kit that can be easily and economically manufactured.

It is another object of this invention to provide a ball joint repair kit that can be easily installed.

Other objects and advantages of the present invention will become apparent as the following description proceeds.

To the accomplishment of the foregoing and related ends, said invention, then, comprises the features hereinafter fully described and particularly pointed out in the claim, the following description and the annexed drawings in which like numerals are employed to designate like parts throughout setting forth in detail certain illustrative embodiments of the invention, these being indicative, however, of but a few of the various ways in which the principle of the invention may be employed.

Figure 2:
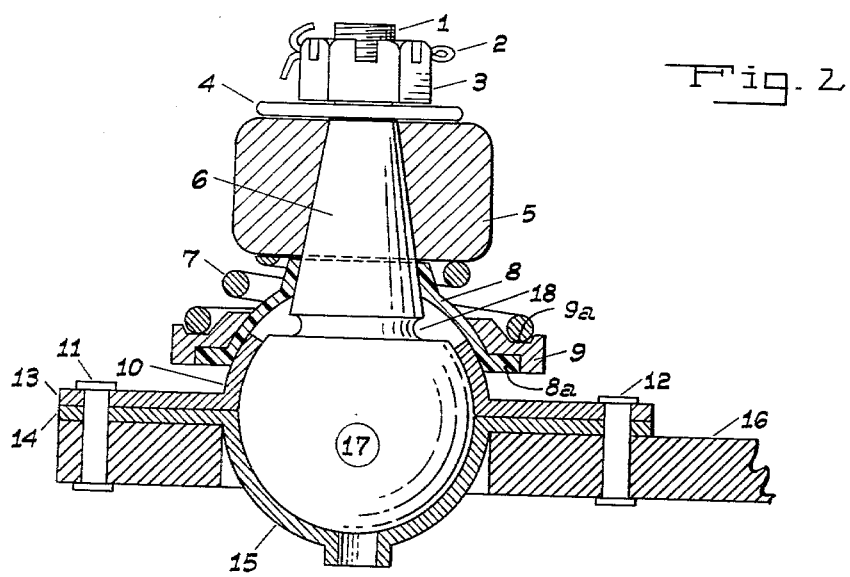

In said annexed drawings:

FIGURE 1 is an elevational view of the kit in operating position on a ball joint assembly, illustrating in dotted lines, its connection with a steering knuckle and a load supporting arm; and, FIGURE 2 is a vertical cross-sectional view of the kit, steering knuckle and load supporting arm of FIGURE 1.

In brief, the foregoing objects and advantages are attained by employing a heavy loaded tapered helical spring adapted to surround the shank of a ball joint stud between its connection with a wheel steering knuckle and the ball joint housing which is connected to the distal end of the load supporting arm. One end of this spring (end of the helix having the larger diameter) is supported by a retaining member which in turn is retained by a flange on an inverted cup-shaped anti-friction member, the inner surface of which engages the adjacent outer spherical surface of the housing. The opposite end of the spring (small end of the helix) is in contact with the wheel steering knuckle.

Referring to the drawings in detail there is shown, as a whole, a ball and socket joint employed for connecting the distal end portion 16 of a load supporting arm to the steering knuckle or member 5 forming a part of a wheel spindle, not shown. The ball and socket joint includes a divided housing; a lower half 15 so formed to define a substantially hemispherical inner bearing surface provided with a flanged edge 14 and an upper half 10 so formed to define a segmental spherical inner bearing surface provided with flanged edge 13. Flanged edge 13 is in flat cooperating contact with flanged edge 14.

Ball stud 1 having a ball end 17 is co-operatingly nested by the inner spherical walls of the two housings 10 and 15. The ball stud includes a shank end 6 projecting outwardly from the housing 10 through an opening formed in the polar region of housing half 10. Diametrically this opening is greater than that of the shank 6 in order to permit freedom of lateral movement of the latter. Flanges 10 and 15 are secured together by means of bolts, rivets or by spot welding thus forming with the ball stud 1, an integral ball joint unit. The flanged edges of the housing are connected, as by rivets or bolts 11 and 12, to the distal end of a load supporting arm 16 of the vehicle while the shank 6 is extended through a suitable aperture in the steering knuckle 5 of the wheel support structure. The shank 6 preferably tapers inwardly from the groove 18 toward the end opposite the ball end 17 and threadedly receives a nut 3 to form a rigid connection with the steering knuckle 5. Many of the component parts described above are more or less conventional with several makes of automotive vehicles and are described herein only to set forth a workable combination. For further background on ball joint suspension assemblies reference is made to U.S.

Patents 2,885,236, dated May 5, 1959 issued to T. F. Carlson and 2,933,336, dated April 19, 1960 issued to A. J. Prichard et al.

In carrying out the invention an anti-friction member 8 having a segmental spherical or inverted cup-shaped wall portion the inner surface thereof adapted for co-operative contiguous contact with the outer spherical surface of the upper housing half 10 is placed upon the latter. Member 8 is provided with a central aperture defined by a frusto-conical shaped neck portion the diameter of which is substantially equal to the diameter of shank 6 which projects therethrough thus providing a snug fit sealing in grease and sealing out dirt and moisture. Anti-friction member 8 extends beyond the polar region of housing 10, through which shank 6 projects, toward the flange 13 but terminates in an annular portion 8a short of contact with the flange 13. Thus member 8 is kept coaxially aligned with the shank while the housing pivots on the ball. A ring-shaped spring retaining member 9 having an inner surface adapted for contiguous contact with a portion of the outer surface of member 8 is then placed upon member 8 and is held in place by a flat surface of the ring 9, intersecting the inner surface, in face to face contact with the flange 8a. As illustrated member 9 is provided with a groove 9a which faces the steering knuckle 5.

A heavy loaded tapered-helical spring 7 is interposed between the steering knuckle 5 and the upper ball housing 10 and around shank 6. Diametrically the large end of spring 7 is such that it is co-operatively received and retained by the groove 9a in ring 9. The opposite or small end of spring 7 is preferably partially flattened so that it substantially flatly contacts the steering knuckle 5. The spring 7 is preferably designed so that, when installed as described it will be under a comparatively heavy load of about 250 p.s.i. exerting force against the steering knuckle 5 and the ball housings 10 and 15 thus urging the hemispherical portion of the ball end adjacent the shank toward substantially constant operative bearing contact with the inner surface of the housing half 10 when the front end of the vehicle is relieved of its weight.

In ordinary ball suspension joints, when the ball and socket become worn, the ball becomes loose in the socket causing rattles and permitting the front end of the vehicle to become out of alignment. Such looseness permits the entry of dirt and moisture which accelerates further wear on the ball and socket. In the present device the compression of the spring 7 holds the ball against the socket under tension and yet permits free oscillation of the ball within the socket. Any looseness that might develop as the result of wear is automatically taken up by the expansion of the spring. Looseness of fit between the parts of the ball joints become quite evident in wheel shimmy, resulting in excessive tire wear, road wandering of the vehicle and difficulty in driving to say the least.

An important element in my invention is the anti-friction member 8. This member must be constructed of a material that will meet the following criteria:

(1) Be anti-friction.
(2) Capable of withstanding considerable pressure.
(3) Possess a high degree of sealing action.

The first criterion is important because there is considerable movement of member 8 on housing 10 during normal operation of the automotive vehicle. As pointed out above spring 7 is subjected to a pressure of about 250 p.s.i. which means that member 8 is subjected to at least an equal force, hence the requirement that it be capable of withstanding compressive forces. Since the ball joint must be lubricated, it is necessary that member 8 possess sealing properties to a rather extensive degree to aid in the retention of the lubricant on the bearing surfaces. Furthermore efficient sealing means dust and moisture are prevented from entering into the bearing. Materials which I have found to be particularly suitable for use in the construction of member 8 are certain resins derived from petroleum of which the product available commercially under the trade name Marlex, is particularly suitable. Other resins which may be used include Teflon and nylon.

The importance of this feature of my invention will be apparent to those skilled in the art when it is remembered the so-called spring retaining member corresponding to my anti-friction member 8 has always been constructed of metal. Since this member moves or slides upon the housing, the inner surface of the spring retaining member must be case hardened, as by gas carburizing, to provide a surface thereon which is approximately five points above or below the hardness of the housing half which it contacts as measured on the Rockwell hardness scale. After that the spring retaining member is cadmium plated to provide a mating or bearing surface which will not "gald." Furthermore when this design is used a washer must be interposed between the top of the spring and the steering knuckle and this washer must be treated in a similar manner to prevent "galding." When metal is used for the construction of these spring retaining members a separate sealing means must be provided. In speaking of washers, washer 4 is optional equipment and if desired it may be eliminated.

As to the ring-shaped spring retaining member 9 that may be constructed of any suitable metal such as steel or more preferably a copper alloy of which brass is a specific example. If desired, however, member 9 may be constructed of aluminum alloys or even certain plastics.

While I have described my invention in rather specific details it should be understood that certain modifications can be made therein and other modes of applying the principle of the invention may be employed, change being made as regards the details described, provided the features stated in the following claim or the equivalent of such be employed.

I therefore, particularly point out and distinctly claim as my invention:

A suspension ball and socket joint for connecting a steering knuckle to the distal end of a load supporting arm comprising: a housing connected with said arm, said housing having a segmental spherical inner and outer wall, said housing having an opening; a stud having a segmental spherical ball end portion in bearing engagement with the inner spherical wall of said housing, said stud having a tapered shank end portion integral with the ball end portion and extending outwardly away from the housing opening and connected with said steering knuckle; a cup-shaped plastic anti-friction member having inner and outer segmental wall portions and having a frusto-conical shaped neck at one end thereof coaxially surrounding the tapered end portion of said shank in sealing engagement therewith, said anti-friction member having said inner spherical wall portion surrounding and engaging the adjacent outer spherical wall surface of said housing, the end portion of said cup-shaped anti-friction member which surrounds the outer segmental spherical wall of said housing terminating in a radially outwardly extending flange; an annular spring retaining member having an inner surface contiguously engaging a portion of the outer spherical surface of said anti-friction member, said annular spring retaining member having a radially extending flange providing a flat surface, intersecting its inner spherical surface and being in face to face contact with and retained by said radially outwardly extending flange on said anti-friction member, said annular spring retaining member having an annular groove on its outer surface facing toward said steering knuckle; and a heavy loaded tapered helical compression spring coaxially surrounding the shank of said stud and interposed between and engaging said steering knuckle and the groove in said annular spring retaining member, said annular spring retaining member also having an axial extending flange on the outer periphery of its radial flange, which axial flange extends over and completely covers the outer periphery of said radially outwardly extending flange on said anti-friction member.

References Cited by the Examiner
UNITED STATES PATENTS 2,569,823 10/51 Moskovitz.
2,761,695 9/56 Graham.
2,954,993 10/60 Scheublein.
2,957,713 10/60 Herbenar.
2,999,709 9/61 Melton et al.
3,079,183 2/63 Melton et al.

THOMAS F. CALLAGHAN, *Primary Examiner.*
WALTER A. SCHEEL, *Examiner.*